(12) United States Patent
Ross et al.

(10) Patent No.: US 10,402,908 B1
(45) Date of Patent: Sep. 3, 2019

(54) COMPUTER METHOD AND SYSTEM FOR CREATING A PERSONALIZED BUNDLE OF COMPUTER RECORDS

(71) Applicant: Massachusetts Mutual Life Insurance Company, Springfield, MA (US)

(72) Inventors: Gareth Ross, Amherst, MA (US); Yaron Ben-Zvi, Hastings on Hudson, NY (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 569 days.

(21) Appl. No.: 15/133,892

(22) Filed: Apr. 20, 2016

Related U.S. Application Data

(60) Provisional application No. 62/149,974, filed on Apr. 20, 2015.

(51) Int. Cl.
*G06Q 40/08* (2012.01)

(52) U.S. Cl.
CPC .................... *G06Q 40/08* (2013.01)

(58) Field of Classification Search
CPC ...................................................... G06Q 40/08
USPC ............................................................ 705/4
See application file for complete search history.

(56) References Cited

U.S. PATENT DOCUMENTS

| | | | |
|---|---|---|---|
| 2005/0108064 A1 | 5/2005 | Castleman et al. | |
| 2013/0332204 A1* | 12/2013 | Fiori ...................... | G06Q 40/08 705/4 |
| 2014/0257871 A1* | 9/2014 | Christensen ............. | G07C 5/00 705/4 |

OTHER PUBLICATIONS

Yang, Dong; A method for web service discovery and dynamic composition based on service chain; Germany, Springer Verlag. (Year: 2012).*

* cited by examiner

*Primary Examiner* — Edward Chang
(74) *Attorney, Agent, or Firm* — Eric L. Sophir; Dentons US LLP

(57) ABSTRACT

System and method for providing personalized, time-varying layered bundles of computer records to users. The system includes personalized servers, a communications network, user interfaces, and client devices employed by users. The personalized server includes a needs analysis module, a bundle building module, and an bundle generating module. A method of providing personalized bundle of computer records includes receiving a request for a personalized bundle of computer records, and requesting user needs data associated with the client. The method further includes converting the user data into determined needs data, and building a bundle of computer records personalized to the user using the determined needs data, which may include a determined needs timeline. The personalized, time varying bundle of computer records includes a plurality of computer records and plurality of types of bundles of computer records represented in the determined needs data. Following user approval of the personalized, time-varying layered bundle of computer records, the method generates the bundle of computer records based upon bundle generating criteria.

15 Claims, 5 Drawing Sheets

COMPUTER METHOD AND SYSTEM FOR CREATING A PERSONALIZED BUNDLE OF COMPUTER RECORDS

CROSS-REFERENCE TO RELATED APPLICATIONS

This application claims priority to U.S. Provisional Patent Application Ser. No. 62/149,974, entitled "Computer Method and System for Creating a Personalized Insurance Policy," filed Apr. 20, 2015, which is hereby incorporated by reference in its entirety.

TECHNICAL FIELD

The present disclosure relates to computer systems and methods for creating a personalized bundle of computer records.

BACKGROUND

Insurance companies offer a variety of policies to cover different types of incidents that may affect a person's life and/or livelihood. Types of insurance include: long term care access, life insurance, disability income insurance, homeowner's insurance, supplemental hospital indemnity insurance, mortgage insurance, automotive insurance, and others. The sheer variety of insurance makes it difficult for a client to determine which policies to purchase.

These different insurance types are generally sold either alone or in small groups by different companies. Each of these companies has its own overhead expenses, marketing and sales expenses, and underwriting costs. Additionally, each insurance company typically underwrites a different policy for each insurance purchase, even when purchasing a subsequent policy for the same type of insurance coverage. This practice is inefficient for insurance companies and costly for consumers. As such, there remains a need for systems and methods to provide insurance to consumers in an efficient and cost-effective manner.

SUMMARY

Insurance coverage can be provided using layers of insurance, referred to as insurance layering. The insurance layering can involve building a program of insurance coverage using an excess of loss approach. Layered insurance programs in this sense involve a series of insurers writing coverage, each one in excess of lower limits written by other insurers, ultimately providing an insured with a high total limit of coverage. The term layers of insurance also can be used, however, in the sense of insurance policies or insurance programs that are not necessarily intended to address excess of loss considerations, but rather that involve policies or programs combining different types of insurance, typically addressing various needs of the insured. The methods and systems of the present disclosure for providing personalized, layered policies use the term "layered policies" in this sense of combining different types of insurance, addressing various needs of the insured.

The embodiments described herein include methods and systems for providing a personalized bundle of computer records (e.g., insurance) through analysis of a user's needs for a bundle of computer records (e.g., insurance). A system and method for creating a personalized, layered bundle of computer records (e.g., insurance policy) provides an input interface to the user, for example by a needs analysis module of the system. The user responds with user data including data relating to the user's needs for a bundle of computer records (e.g., insurance). The system (and method), upon receiving the user data, converts the user data into determined needs data associated with the user. Using the determined needs data, the system, such as a bundle (e.g., policy) building module, generates bundle (e.g., policy) data and uses the bundle (e.g., policy) data to build a bundle of computer records (e.g., insurance policy) personalized to the user. The personalized bundle of computer records (e.g., policy) includes a plurality of computer records, with a plurality of types of bundle of computer records (e.g., insurance) represented in the determined needs data. If the user approves the personalized, layered of computer records (e.g., insurance policy), the system, such as a bundle generating (e.g., underwriting module), generates (e.g., underwrites) the personalized bundle of computer records (e.g., policy) based upon bundle generating (e.g., underwriting) criteria.

In one embodiment, a system includes a personalization server configured with a computer-readable storage medium and includes modules executable by a processor of the personalization server. In an embodiment, the modules include (1) a needs analysis module configured to receive inputted user data over a network from a user computing device that requests a bundle of computer records (e.g., policy), upon receiving the inputted user data, convert the inputted user data received from the user computing device into determined needs data, and store the determined needs data in a determined needs data database, (2) a bundle (e.g., policy) building module configured to generate bundle (e.g., policy) data based upon the data in the determined needs data database to build a single time-varying bundle of computer records (e.g., policy) that is personalized to a user of the user computing device, where the bundle (e.g., policy) data includes a plurality of computer records with a plurality of types of bundle of computer records (e.g., insurance) based upon the determined needs data, where a first computer record has a first bundle (e.g., policy) configuration for determined needs during a first time period, and a second computer record has a second bundle (e.g., policy) configuration for determined needs during a second time period, and store the bundle (e.g., policy) data in a bundle (e.g., policy) data database and (3) a bundle generating (e.g., underwriting) module configured to generate a single personalized, time-varying bundle of computer records (e.g., policy) using the bundle (e.g., policy) data in the bundle (e.g., policy) data database, where the single personalized, time varying bundle of computer records (e.g., policy) includes the plurality of bundle (e.g., policy) layers with the plurality of types of bundle of computer records (e.g., insurance) based on the determined needs data, where a term of the single personalized, time-varying bundle of computer records (e.g., policy) includes the first time period and the second time period, and transmit a representation of the single personalized, time-varying bundle of computer records (e.g., policy) to the user computing device.

In another embodiment, a processor-based method includes (1) transmitting, by a processor, a form for presentation on a graphical user interface for display on a user computing device to receive an input of user data for a bundle of computer records (e.g., policy) request, (2) upon receiving, by the processor, a transmission of a bundle of computer records (e.g., policy) request message including inputted user data via the form presented on the graphical user interface of the user computing device, (3) converting, by the processor, the user data into determined needs data associated with the user, where the determined needs data includes information about one or more particular life stages of the user, (4) generating, by the processor, a single time-varying bundle of computer records (e.g., policy file) that is personalized to the user and based upon the determined needs data, where the single time-varying bundle of computer records (e.g., policy file) includes a plurality of computer records, where each of the plurality of computer records (e.g., layer) is associated with a life stage and the determined needs data, and where generating includes calculating a set of data (e.g., coverage) for each computer record (e.g., layer) of the single time-varying bundle of computer records (e.g., policy file) and aggregating the set of data (e.g., coverage) of each computer record (e.g., layer) in the single time-varying bundle of computer records (e.g., policy file), and (5) transmitting, by the processor, a representation of the single time-varying bundle of computer records (e.g., policy file) personalized to the user computing device for display on the graphical user interface.

In another embodiment, a system includes a personalization server configured with a computer-readable storage medium and including modules executable by a processor of the personalization server. In an embodiment, the modules include (1) a needs analysis module configured to present a form for inputting user data to a user requesting a bundle of computer records (e.g., policy), to receive the user data from the user, upon receiving the user data, to convert the user data received from the user into determined needs data including a determined needs timeline, and store the determined needs data in a determined needs data database, (2) a bundle (e.g., policy) building module configured to generate bundle (e.g., policy) data by numerical analysis of the determined needs data in the determined needs data database to build a single bundle of computer records (e.g., policy), where the bundle (e.g., policy) data includes a plurality of computer records represented in the determined needs data, and where the bundle (e.g., policy) data includes first set of data (e.g., coverage) during a first set of data (e.g., coverage) period and a second set of data (e.g., coverage) during a second set of data (e.g., coverage) period, and store the policy data in a policy data database, and (3) a bundle generating (e.g., underwriting) module configured to create a single personalized bundle of computer records (e.g., insurance policy) using the bundle (e.g., policy) data in the bundle (e.g., policy) data database, wherein the single personalized bundle of computer records (e.g., insurance policy) includes the plurality of computer records represented in the determined needs data, where the single personalized bundle of computer records (e.g., insurance policy) includes the first set of data (e.g., coverage) during the first set of data (e.g., coverage) period and the second set of data (e.g., coverage) during the second set of data (e.g., coverage) period, and where the single personalized bundle of computer records (e.g., insurance policy) has a bundle of computer records (e.g., policy) term including the first set of data (e.g., coverage) period and the second set of data (e.g., coverage) period.

In another embodiment, a processor-based method includes (1) presenting, by a processor, an input interface for providing user data for display on a user computing device to a user requesting a bundle of computer records (e.g., policy), (2) upon receiving, by the processor, user data provided by the user via the input interface, converting, by the processor, the user data into determined needs data associated with the user, the determined needs data including a determined needs timeline, (3) generating, by the processor, bundle (e.g., policy) data by numerical analysis of the determined needs data to build a single bundle of computer records (e.g., policy), the bundle (e.g., policy) data including a plurality of computer records represented in the determined needs data, and including a first set of data (e.g., coverage) during a first set of data (e.g., coverage) period and a second set of data (e.g., coverage) during a second set of data (e.g., coverage) period, and (4) creating, by the processor, a single bundle of computer records (e.g., insurance policy) personalized to the user using the bundle (e.g., policy) data, where the single of computer records (e.g., insurance policy) includes the plurality of computer records represented in the determined needs data, and includes the first set of data (e.g., coverage) during the first set of data (e.g., coverage) period and the second set of data (e.g., coverage) during the second set of data (e.g., coverage) period, and where the single personalized bundle of computer records (e.g., insurance policy) has a bundle of computer records (e.g., policy) term including the first set of data (e.g., coverage) period and the second set of data (e.g., coverage) period.

In yet another embodiment, a processor-based method includes (1) upon receiving, by a user interface provided by the processor, user data provided by a user requesting a bundle of computer records (e.g., policy), converting, by the processor, the user data into determined needs data associated with the user, (2) generating, by the processor, bundle (e.g., policy) data to build a single bundle of computer records (e.g., policy), where the single bundle of computer records (e.g., policy) includes a plurality of computer records with a plurality of types of bundle of computer records (e.g., insurance) represented in the determined needs data, and where the single bundle of computer records (e.g., policy) provides a first set of data (e.g., coverage) during a first set of data (e.g., coverage) period, and a second set of data (e.g., coverage) during a second set of data (e.g., coverage) period, within a bundle of computer records (e.g., policy) term of the single bundle of computer records (e.g., policy), and (3) generating (e.g., underwriting), by the processor, a single bundle of computer records (e.g., policy) personalized to the user using the bundle (e.g., policy) data, where the single bundle of computer records (e.g., policy) personalized to the user includes the plurality of computer records with the plurality of types of bundle of computer records (e.g., insurance) represented in the determined needs data, where the single policy includes the first set of data (e.g., coverage) during the first set of data (e.g., coverage) period, and the second set of data (e.g., coverage) during the second set of data (e.g., coverage) period, within the bundle of computer records (e.g., policy) term of the single bundle of computer records (e.g., policy), and where the generating a single bundle of computer records (e.g., policy) personalized to the user (e.g., underwriting) is based upon bundle generating (e.g., underwriting) criteria.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1:
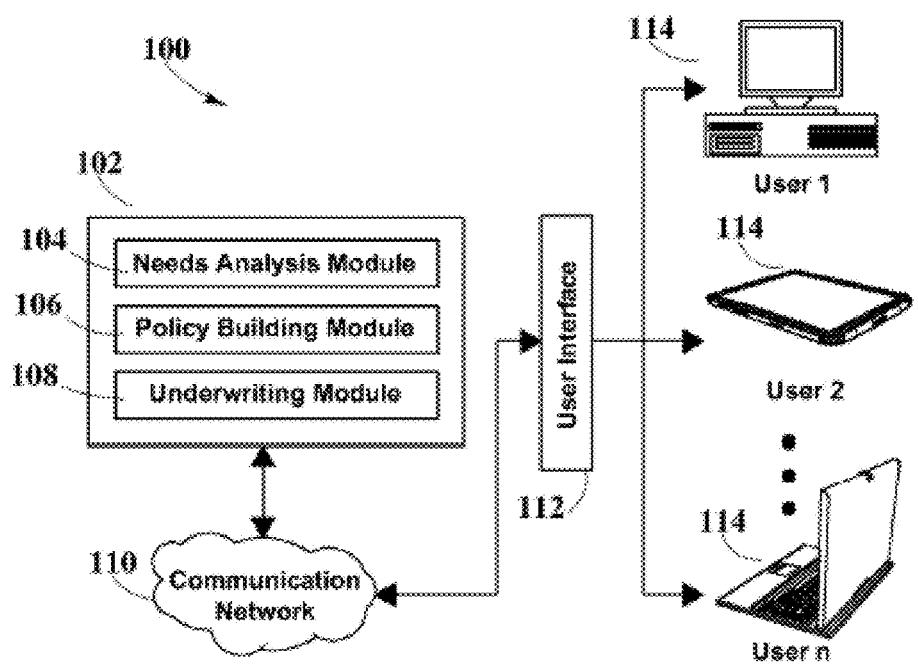
FIG. 1 is a functional block diagram illustrating a system architecture for a personalized insurance system, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here. Furthermore, the various components and embodiments described herein may be combined to form additional embodiments not expressly described, without departing from the spirit or scope of the invention.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Systems and methods for providing personalized bundles of computer records (e.g., insurance policies) are disclosed. The methods may include the determination of the bundle of computer records (e.g., insurance) needs of a client, building a bundle of computer records (e.g., policy) that matches the client's determined needs, and creating (e.g., underwriting) the bundle of computer records. The disclosed methods may be implemented by users in interaction with computer systems. In one or more embodiments, the computer systems may include a personalized server (e.g., personalized insurance server) which may further include any number of software tools running on any number of computing devices where the computing devices may communicate using any network infrastructure. Examples of computing devices may include personal computers, tablet devices, and mobile phones, amongst others. Examples of network infrastructures may include intranets, local area networks (LAN), virtual private networks (VPN), wireless area networks (WAN) and the World Wide Web, amongst others. As used herein, the term "bundle" refers to a collection of computer records associated with each other, wherein the association is based upon common values of a set of criteria for the data in each computer record.

FIG. 1 is a functional block diagram illustrating a system architecture for a personalized insurance system. In FIG. 1, System Architecture 100 includes Personalized Insurance Server 102, Communications Network 110, User Interface 112, and Client Devices 114. In FIG. 1, Personalized Insurance Server 102 includes one or more modules, such as, Needs Analysis Module 104, Policy Building Module 106, Underwriting Module 108, and others. In some embodiments, System Architecture 100 includes additional, fewer, different, or differently arranged components than those illustrated in FIG. 1.

In FIG. 1, Personalized Insurance Server 102 is coupled to and in bidirectional communication with Communications Network 110. Communications Network 110 is coupled to and in bidirectional communication with User Interface 112. User Interface 112 is coupled to and in bidirectional communication with one or more Client Devices 114.

In FIG. 1, Communications Network 110 is implemented as a network infrastructure, such as, for example intranets, local area networks (LAN), virtual private networks (VPN), wireless area networks (WAN), the internet, and the world wide web, among others. In some embodiments, User Interface 112 is implemented as a web interface, an application interface, and the like.

In some embodiments, Personalized Insurance Server 102 receives user requests and user data from Client Devices 114 and provides user policy data to client device 114. Personalized Insurance Server 102 can be implemented as any computing device configured to receive a request for a bundle of computer records (e.g., insurance) from one or more users, request user data necessary to determine user needs data associated with the one or more users, builds a bundle of computer records including bundle data (e.g., policy data) that addresses said needs, modifies (e.g., underwrites) the bundle data to produce a bundle of computer records (e.g., policy), and provide the bundle data to client devices for disseminating the associated users. In some embodiments, user data include demographic information regarding the user, such as, for example age, income, height, weight, marital status, number of dependents, health history, and the like. In these embodiments, user needs data includes bundle of computer records (e.g., insurance) types, bundle of computer records (e.g., insurance) amounts, set of data (e.g., insurance coverage) periods, investment vehicles, and the like. Further to these embodiments, bundle data (e.g., policy data) includes proprietary data about specific products (e.g., insurance company products) including rates/premiums, coverage exclusionary periods, coverage amounts, and the like. In these embodiments, Personalized Insurance Server 102 is configured to run a desired set of modules, including Needs Analysis Module 104, Policy Building Module 106, Underwriting Module 108, and others.

In some embodiments, Needs Analysis Module 104 is implemented as software running on a server that includes a processing unit for running related algorithms or computer executable program instructions. In these embodiments, Needs Analysis Module 104 is configured to receive information associated with one or more clients (i.e., user data), process said user data to determine the bundle of computer records (e.g., insurance) needs data of the one or more clients, and provide said determined insurance needs to other modules. In an example, Needs Analysis Module 104 provides the determined bundle of computer records (e.g., insurance) needs to Policy Building Module 106 and/or Underwriting Module 108.

In some embodiments, Policy Building Module 106 is implemented as software running on a server that includes a processing unit for running related algorithms or computer executable program instructions. In these embodiments, Policy Building Module 106 is configured to receive determined bundle of computer records (e.g., insurance) needs associated with one or more clients, process the determined bundle of computer records (e.g., insurance) needs to produce bundle (e.g., policy) data that meets the needs, and provide the bundle (e.g., policy) data to other modules. In an example, Policy Building Module 106 provides the bundle (e.g., policy) data to Underwriting Module 108.

In some embodiments, Underwriting Module 108 is implemented as software running on a server that includes a processing unit for running related algorithms or computer executable program instructions. In these embodiments, Underwriting Module 108 is configured to receive bundle (e.g., policy) data associated with the one or more clients, create (e.g., underwrite) said bundle (e.g., policy) data and issue a bundle of computer records (e.g., policy) that meets creating (e.g., underwriting) criteria associated with the creating (e.g., underwriting) process.

In operation, Needs Analysis Module 104 gathers user data via a User Interface 112 displayed on a Client Device 114. In some embodiments, the user data is gathered through one or more questionnaires displayed as part of User Interface 112. The gathered user data is processed by Needs Analysis Module 104 to determine the needs analysis data associated with the one or more clients over predefined periods of time. The determined needs data is received by Policy Building Module 106 from Needs Analysis Module 104, and the determined needs data is then used by Policy Building Module 106 to generate bundle (e.g., policy) data that will be used to generate bundles of computer records (e.g., policies) that are personalized to the one or more clients. In other embodiments, Policy Building Module 106 generates bundle (e.g., policy) data that will be used to create (e.g., underwrite) a single bundle of computer records (e.g., policy) that matches the needs of each individual client. In yet other embodiments, Policy Building Module 106 generates bundle (e.g., policy) data that will be used to create (e.g., underwrite) a single policy that matches the needs of an individual client to a desired level of tolerance (e.g. within a predetermined dollar amount, a predetermined period of time, or predetermined estimated premium, among others). The generated bundle (e.g., policy) data is then received by Underwriting Module 108 from Policy Building Module 106 and created (e.g., underwritten) to produce a bundle of computer records (e.g., policy) that meets creating (e.g., underwriting) criteria associated with the creating (e.g., underwriting) process. In some embodiments, the bundle of computer records (e.g., policy) is then issued and forwarded to associated users via Communications Network 110, User Interface 112, and associated Client Devices 114.

In gathering user data and processing this data to determine the needs analysis data associated with the one or more clients over predefined periods of time, Needs Analysis Module 104 together with other components of the personalized insurance system 100 facilitates flexible, highly personalized bundles of computer records (e.g., insurance policies) meeting the needs of individual clients. Needs Analysis Module 104 may gather and analyze user needs data to generate determined needs data pertaining to a variety of bundle of computer records (e.g., insurance) types, bundle of computer records (e.g., insurance) amounts, set of data (e.g., insurance coverage) periods, investment vehicles, and the like. This determined needs data may be processed by Policy Building Module to produce bundle (e.g., policy) data that may generate a single bundle of computer records (e.g., insurance policy) personalized to the user includes the plurality of computer records (e.g., policy layers) with the plurality of types of bundle of computer records (e.g., insurance) represented in the determined needs data.

Figure 5:
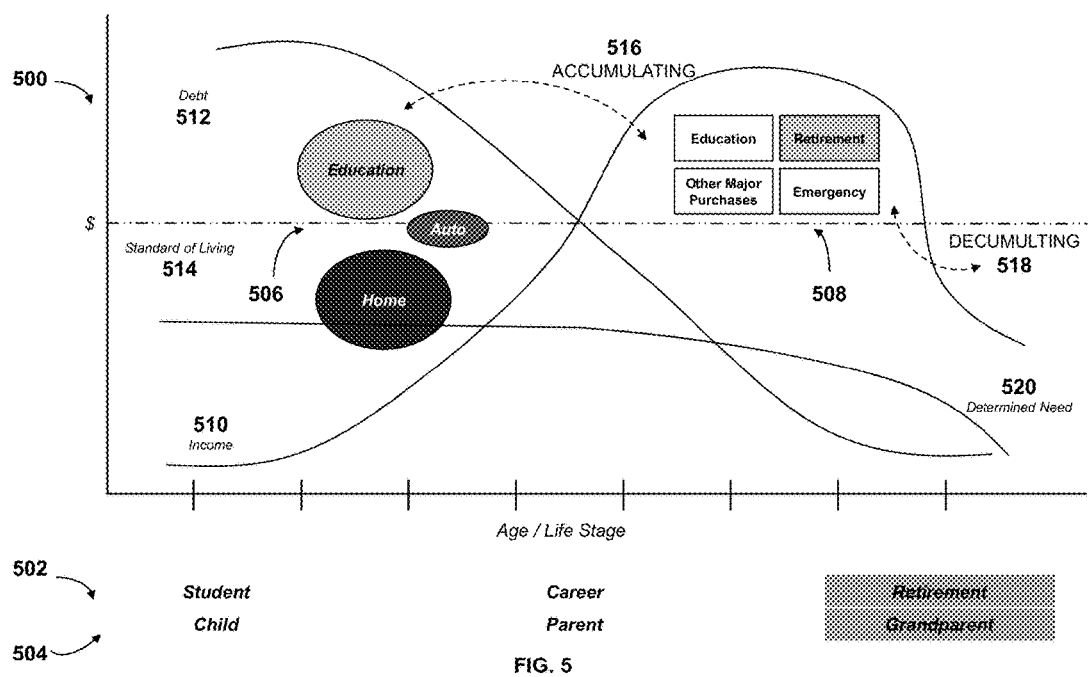
FIG. 5 is an exemplary diagram illustrating user needs and financial circumstances of a user at various life stages of the user.

In an embodiment, Needs Analysis Module 104 receives from a user and analyzes data concerning user needs, and related user circumstances such as financial circumstances, over time. Needs Analysis Module 104 converts the received user data to determined needs data used in planning a personalized bundle of computer records (e.g., insurance coverage) for the user. FIG. 5 is a diagram 500 of financial circumstances and financial needs of a user at various life stages of the user. This diagram plots recipient income 510 and debt 512 at various life stages, shown as life statuses 502 (student/career/retirement) and family roles 504 (child/parent/grandparent). Life stages through late career are shown as a period of increasing income 510, decreasing debt 512, and accumulating funds 516, while retirement is shown as a period of decreasing income 510 and decumulating funds 518. This diagram shows a first set of determined needs 506—education, home, and automobile—at early life stages bridging student years and early career. A second set of determined needs 508—including education (of dependents), retirement, other major purchases, and emergency funds—are shown for later life stages including late career and retirement. A target standard of living is shown at 514.

FIG. 5 illustrates examples of the receipt of user needs data by the Needs Analysis Module 104, and the analysis of these user needs data to convert this data to determined needs. Determined needs 506, 508 may be based on suggestions of determined needs received by the Needs Analysis Module from users; may be based on analysis of user needs data provided by users via e.g. via user interface 112; and may include determined needs generated by the Needs Analysis Module 104 based upon user profiles (e.g. financial projections for income 510 and debt 512, and user information concerning key events during life stages 502, 504); among other possibilities.

In an embodiment, Needs Analysis Module analyzes received user data, e.g. at various life stages of the user, to model determined needs of the user over time. As example is shown in FIG. 5 in a plot 520 of a determined need for life insurance, e.g. over a 30 year time period. The Needs Analysis Module models determined need 520 continuously over time in a plot that declines non-linearly to approximately zero at year 30. In this example, the determined need 520 for life insurance coverage remains substantially level during the insured's peak needs years and then declines non-linearly as the insured ages. In some embodiments, this determined needs is based in part on an assumption that the insured's survivors' needs also decline over time, after a period of peak insurance needs, as both the insured and the insured's survivor(s) accrue 516 wealth over the time period.

A significant aspect of providing determined needs is the analysis of user needs over a time period of a user's life (various user ages/life stages 502, 504). Needs Analysis Module 104 provides enables users to provide key times and life events such as projected retirement age, projected purchase of a home, or educational milestones of children, that may result in abrupt changes to user needs. In an embodiment, Needs Analysis Module may analyze other data provided by a user to calculate certain key times and life events; for example the user's 65th birthday, when the user becomes eligible for Medicare. In addition, the Needs Analysis Module may analyzes user data to provide determined needs that increase and/or decrease over time (year-to-year trends of determined needs). Needs Analysis Module 104 may provide the user with a timeline template to facilitate providing user needs data for particular times or time periods. As described below, Policy Building Module 106 analyzes the determined needs to recommend a time-varying, layered insurance policy that meets these determined needs at various user ages/life stages 502, 504 of the user. For example, the time-based needs data may be used by Policy Building Module 106 to reprioritize determined needs 506, 508, and to rebalance Layered Insurance Policy layers meeting these determined needs, over time. As used in the present disclosure, "determined needs timeline" means determined needs provided by Needs Analysis Module over a time period of a user's life, including changes in user needs over time, and key times/events relating to user needs.

A novel aspect of the present method and system for providing personalized insurance is the generation of personalized, "layered" policies that combine different types of insurance in a single policy, addressing various needs of the insured, wherein the layered policy may be flexibly designed to meet determined needs of clients over predetermined periods of time. In an embodiment, "predetermined periods of time" refers to time periods that may be defined by the Policy Building Module 106 in order to provide insurance products that meet the client's determined needs over these periods of time. In an embodiment, Policy Building Module 106 defines the predetermined periods of time with reference to a determined needs timeline provided by the Needs Analysis Module 104, In an embodiment, the predetermined periods of time are included in the policy data that is received by Underwriting Module 108, to underwrite the policy data and issue a policy.

The present disclosure uses the following nomenclature in referring to defining various times and time periods pertinent to present method and system for providing personalized insurance. The "policy date" (also called policy issue date, or policy inception date), is the date as of which the policy is officially enforced. The "policy expiration date" is the date on which the policy ceases to be officially enforced. The "policy period" (also called the "policy term") encompasses the time period between policy inception date and policy expiration date. In one embodiment, in policies with a policy period that exceeds one year, the "anniversary date" is the one year anniversary of the policy inception date, and same day as the policy date for each succeeding year during the policy term. For one-year policies, "anniversary date" also can refer to the policy's renewal date. In other embodiments, as "anniversary date" is used in the present patent application, the anniversary date may correspond to time periods following the policy date other than one year. For example, a biennial anniversary date is the two year anniversary of the policy inception date, and same day as the policy date for each successive two year period. Anniversary dates that are not a multiple of one year also are possible; e.g. a semiannual anniversary date is the six month anniversary of the policy expiration date, and subsequent size month periods. As used in the present disclosure, "anniversary period" refers to a time period between successive anniversary dates; e.g. the time period between the first and second anniversary dates, or the time period between the second and third anniversary date. "Anniversary period" also may refer to a time period between non-successive anniversary dates, e.g. the time period between the first and third anniversary dates.

Notably, as used in the present disclosure, "insurance coverage periods" may include policy periods, but also may include portions of policy periods, such as anniversary periods during the policy term.

In conventional insurance industry practice, it is sometimes said that insurance policies provide flexible coverage when the policies may be designed with a range of policy periods, such as 10-year, 20-year, and 30-year policy periods. Additionally, conventional insurance practice may plan flexible coverage by underwriting different insurance policies over successive policy periods. The present method and system for personalized insurance provide single, layered insurance policies that provide significantly greater flexibility in insurance coverage over time. As used in the present disclosure, the phrase "time-varying layered coverage" (as well as the phrases "time-varying coverage", "time varying policy", and "time varying insurance policy") refers to single personalized layered insurance policies providing variation over time in coverage (such as insurance types, insurance amounts, and insurance layering) during the policy term. Non-limiting examples of time-varying layered coverage include a single personalized layered policy that provide different coverage during two or more insurance coverage periods during the policy term (e.g., a policy that provides a distinct coverage during each of a series of one-year anniversary periods within the policy term); and a single personalized layered policy with layers that provide coverage expiring at different times during the policy term.

In some embodiments, the user interacting with System Architecture 100 is the client wishing to purchase a personalized insurance policy. In other embodiments, the user interacting with System Architecture 100 is a third party aiding a client pursuing a personalized insurance policy (e.g., an insurance agent aiding a prospective client).

Figure 2:
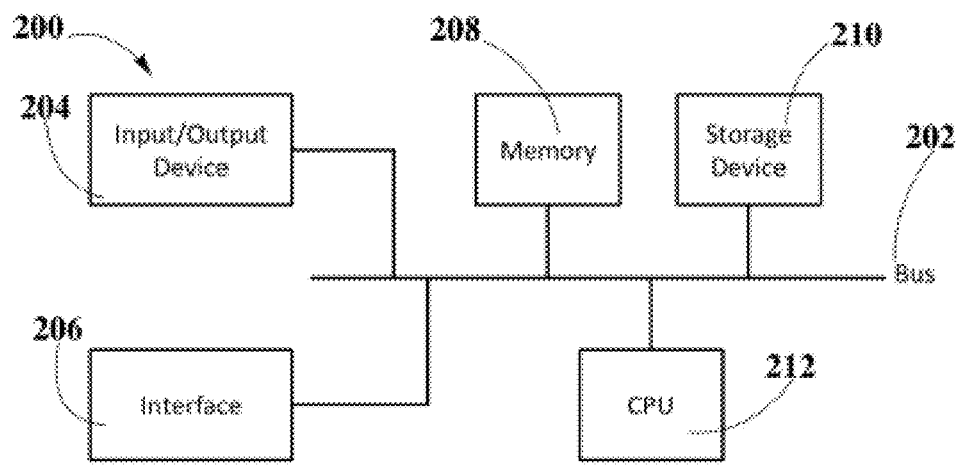
FIG. 2 is an exemplary computing device in which one or more embodiments of the present disclosure may operate, according to an embodiment.

FIG. 2 is an exemplary computing device 200 in which one or more embodiments of the present disclosure may operate, according to an embodiment. In some embodiments, computing device 200 includes bus 202, input/output (I/O) device 204, communication interface 206, memory 208, storage device 210 and central processing unit 212. In other embodiments, computing device 200 includes additional, fewer, different, or differently arranged components than those illustrated in FIG. 2.

In FIG. 2, bus 202 is in physical communication with (I/O) device 204, communication interface 206, memory 208, storage device 210, and central processing unit 212. Bus 202 includes a path that permits components within computing device 200 to communicate with each other. Examples of (I/O) device 204 include peripherals and/or other mechanism that may enable a user to input information to computing device 200, including keyboards, computer mice, buttons, touch screens, voice recognition software and hardware, biometric mechanisms, and the like. (I/O) device 204 also includes one or more mechanisms that output information to the user of computing device 200, such as, for example displays, light emitting diodes (LEDs), printers, speakers, and the like.

Examples of communication interface 206 include mechanisms that enable computing device 200 to communicate with other computing devices and/or systems through network connections. Examples of network connections include connections between computers, such as, for example intranets, local area networks (LANs), virtual private networks (VPNs), wide area networks (WANs), the Internet, and the like. Examples of memory 208 include random access memory 208 (RAM), read-only memory (ROM), flash memory, and the like. Examples of storage device 210 include magnetic and/or optical recording media, ferro-electric RAM (F-RAM) hard disks, solid-state drives, floppy disks, optical discs, and the like. In some embodiments, memory 208 and storage device 210 store information and instructions for execution by central processing unit 212. In other embodiments, central processing unit 212 includes a microprocessor, an application specific integrated circuit (ASIC), a field programmable object array (FPOA), and/or the like. In these embodiments, central processing unit 212 interprets and executes instructions retrieved from memory 208 and storage device 210.

According to some aspects of these embodiments, computing device 200 is implemented as part of a server, Personalized Insurance Server 102, Client Devices 114, and the like. Examples of these implementations include servers, authorized computing devices, smartphones, desktop computers, laptop computers, tablet computers, a PDAs, another type of processor-controlled device that may receive, process, transmit digital data, and the like. Additionally, computing device 200 may perform certain operations that are required for the proper operation of system architecture 100. Suitable computing devices 200 may perform these operations in response to central processing unit 212 executing software instructions contained in a computer-readable medium, such as memory 208.

In some embodiments, the software instructions of system are read into memory 208 from another memory location, such as storage device 210, or from another computing device 200 (e.g., Personalized Insurance Server 102, Client Devices 114, and the like) via communication interface 206. In these embodiments, the software instructions contained within memory 208 instruct central processing unit 212 to perform processes that will be described in FIGS. 3-5, below. Alternatively, hardwired circuitry may be used in place of or in combination with software instructions to implement processes described herein. Thus, implementations described herein are not limited to any specific combination of hardware circuitry and software.

Figure 3:
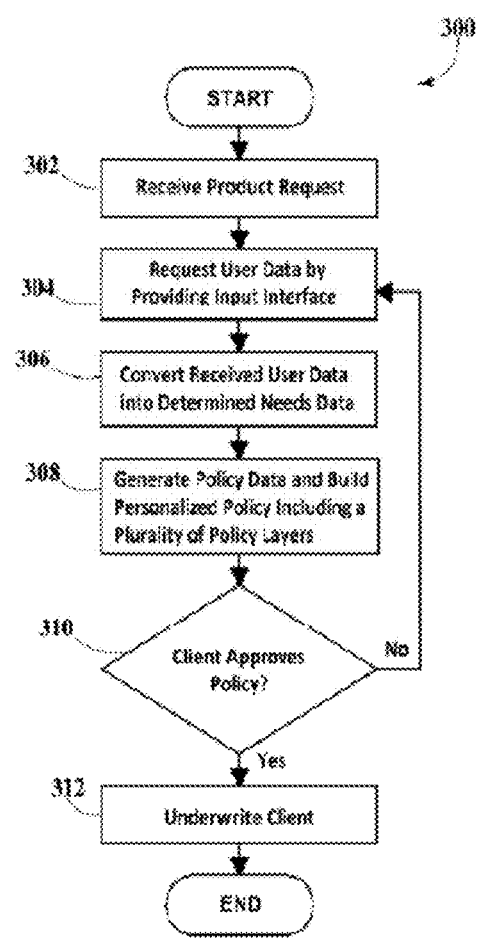
FIG. 3 is a flowchart illustrating an exemplary method of providing personalized insurance, according to an embodiment.

FIG. 3 is a flowchart illustrating an exemplary method of providing personalized insurance, according to an embodiment. In some embodiments, Method 300 includes additional or fewer steps than those depicted in FIG. 3. In these embodiments, one or more steps may be performed in parallel or in a sequence different from that depicted in FIG. 3. In FIG. 3, method 300 begins with Step 302, when a personalized insurance server receives a request for personalized insurance from a user. In some embodiments, the request is received after a user interacts with a user interface in communication with the personalized insurance server. In an example and referring to FIG. 1, personalized insurance server 102 receives a request for personalized insurance from a user associated with client device 114. Method 300 advances to Step 304.

At Step 304, a needs analysis module requests information from the user requesting a personalized insurance policy. In an example, the needs analysis module presents a form for inputting user data to the user requesting a personalized insurance policy, wherein the form for inputting user data may be any type of user interface that permits inputting the user data in any format. Examples of a form for inputting user data include a needs questionnaire, a user profile questionnaire, and a timeline template to facilitate providing time-based user needs data. In some embodiments, requested user data (e.g. requested using a user profile form) includes demographic information regarding the user, such as, for example age, income, height, weight, marital status, number of dependents, health history, user requests, and the like. In examples of inputting user data using a needs questionnaire, a user may input data pertaining to requested coverage such as different coverage types, amounts, periods, and the like. In an embodiment, the needs analysis module requests time-based user data such as key times and life events, which may result in abrupt changes to user needs. In addition, users can provide user data relating to user needs trends, i.e. needs that may increase and/or decrease over time. User requests may be incorporated into user data throughout the insurance acquisition process. Further to these embodiments, the needs analysis module gathers user data via a user interface displayed on a client device. In some embodiments, the user data gathered relates to the type of insurances the insuring entity offers; e.g. demographic information is gathered for health and life insurance; financial information is gathered for Disability Income Insurance, Mortgage Insurance, and College Funds; and the like. Method 300 advances to Step 306.

At Step 306, a needs analysis module converts the user data gathered in Step 304 into determined needs data associated with the client. In an example and referring to FIG. 1 above, needs analysis module 104 uses the user data to generate determined needs data. In some embodiments, determined needs data includes insurance types, insurance amounts, insurance coverage periods, investment vehicles, and the like. In these embodiments, the needs analysis module uses one or more mathematical models to determine how much coverage is needed for one or more aspects of the client's needs over a period of time. In an example, the needs analysis module uses a mathematical model to determine a declining exponential function for the client's life insurance needs. In this example, the model presumes that as the insured ages, the insured's survivors will have fewer needs due to the insured's increased accrual of wealth and the survivor's life expectancy. In other embodiments, other mathematical models are used to model the client's other insurance needs (e.g. mortgage insurance needs, supplemental hospital indemnity insurance, disability income insurance, auto insurance, home insurance, and the like). In a further embodiment, the needs analysis module provides a "determined needs timeline", i.e. determined needs over a time period of the user's life, including changes in user needs over time, and/or key times/events relating to user needs. Method 300 advances to Step 308.

At Step 308, a policy building module receives determined needs data from a needs analysis module and generates policy data based on the received determined needs data. In an example and referring to FIG. 1 above, policy building module 106 receives determined needs data from needs analysis module 104 and generates policy data based on the received determined needs data. In some embodiments, the generated policy data includes an insurance policy layer for each type of insurance the needs analysis module determines a specific client needs. In other embodiments, the policy building module is able to provide insurance policy layers that are able to substantially fit the needs expressed in the determined needs data of the client. In other embodiments, the policy building module is able to provide insurance policy layers able to meet the coverage needs of the client within a desired tolerance. In these embodiments, the tolerances may be across multiple axes of coverage, such as, a time axis (e.g. policy layers with an insurance coverage period of 1, 5, or 10 years depending on the type of insurance layer), a coverage amount axis (e.g. policy layers in US$100,000, US$500,000, and US$1,000,000 increments), a coverage trend axis (year-to-year trends of policy layers' coverage amounts; e.g. downward trend of one policy layer and upward trend of another policy layer), and the like.

In a further embodiment of step 308, the policy building module analyzes the determined needs from step 306 to recommend a single personalized layered insurance policy that provides time-varying layered coverage, meeting these determined needs at various user ages and life stages. In an embodiment, the policy building module builds a time-varying insurance policy providing a first coverage during a first insurance coverage period, and a second coverage during a second insurance coverage period, within a policy term of the time-varying insurance policy. In another embodiment, the policy building module builds a time-varying insurance policy providing a distinct coverage during each of a series of one-year anniversary periods within a policy term of the single personalized, time varying insurance policy. In a further embodiment, the policy building module uses a determined needs timeline included in the determined needs data generated at step 306 to rebalance time-varying layered coverage over time. In one example of this embodiment, the policy building module rebalances policy layers of the time-varying layered coverage between different coverage periods defined by the policy building module within the policy term of the single insurance policy.

In an embodiment, the policy building module incorporates logic for numerical analysis methods of determined needs data, in order to generate policy data for time-varying layered coverage based upon the determined needs data. In an example, the policy building module applies discretization methods to translate determined needs (such as the continuous curve 520 of FIG. 5) into a series of discrete coverage values over a plurality of anniversary periods. In another example, the policy building module applies interpolation methods to calculate coverage values based upon determined needs trends and key events. In a further example, the policy building module applies optimization methods to calculate multiple layers of the time-varying layered coverage in balancing multiple determined needs over time. Method 300 advances to decision Step 310.

At decision Step 310, the personalized insurance server determines whether the client approves of the policy data. In an example and referring to FIG. 1, personalized insurance server 102 determines whether the client approves of the policy data by formatting the policy data into proposal data. In this example, personalized insurance server 102 then passes the proposal data to client device 114 for rendering onto user interface 112. The response of the client is then sent from client device 114 to personalized insurance server 102 via user interface 112. If the client does not approve of the policy, Method 300 returns to Step 304. In some embodiments, a client disapproval may include user requests for different coverage types, amounts, periods, and the like. If the client approves of the policy, Method 300 advances to Step 312.

At Step 312, an underwriting module receives user data and policy data and generates a policy based on the received user data and policy data. In some embodiments, the underwriting module receives the user data from the needs analysis module. In these embodiments, the underwriting module receives policy data from the policy building module. In an example and referring to FIG. 1, underwriting module 108 receives the user data from the needs analysis module 104 and the policy data from policy building module 106. The underwriting module then underwrites the client based on the received user data and policy data. As each type of insurance is approved during the underwriting process, it is assigned to an insurance layer and the insurance layers generated in this manner are combined to make up the policy. In an embodiment, the underwriting module generates a single personalized layered insurance policy providing time-varying layered coverage that varies over predetermined time periods during the policy term. In another embodiment, the underwriting module generates a single personalized layered insurance policy providing different coverage during two or more insurance coverage periods during the policy term.

In some embodiments, the underwriting module interacts with the user via a user interface to request additional documentation needed for underwriting the client. In these embodiments, system may include a data exchange component operable for interacting with external third party data sources to request additional data. For example, the underwriting module may interact with medical professionals associated with the user via email, telecommunications, written correspondence through the mail, and the like, to request additional documentation needed for underwriting the client. In these embodiments, additional documentation includes verified medical records, financial statements, and the like.

In some embodiments, the client is underwritten such that the premiums paid for the policy decline over time, e.g. the premiums paid for owning the policy decline at a steady rate as the policy's coverage declines over time. In other embodiments, the client is underwritten such that the premium remains constant over the term of the policy. In still other embodiments, the client is underwritten such that the premium increases over the term of the policy. After the client is underwritten, fully or partially, a policy is issued. Method 300 then ends.

Figure 4:
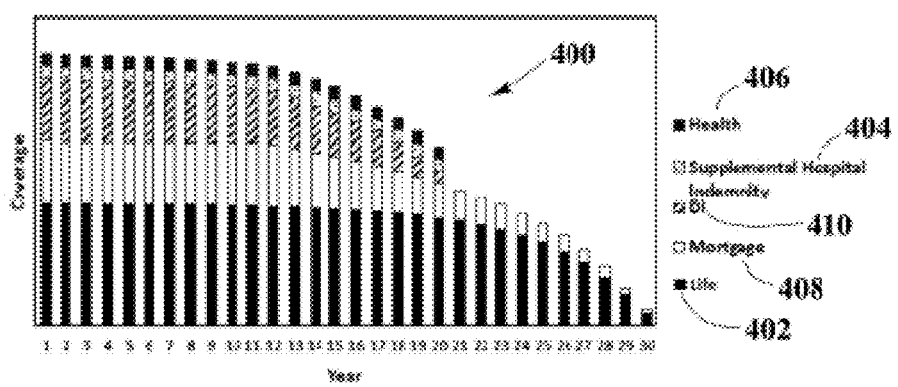
FIG. 4 is an exemplary diagram illustrating a personalized, time-varying, layered insurance policy, according to an embodiment.

FIG. 4 is an exemplary diagram illustrating a time-varying, layered insurance policy, according to an embodiment. In FIG. 4, the coverage associated with an exemplary personalized, Layered Insurance Policy 400 is shown in relation to time, such as, for example illustrating an exemplary client in his/her mid-40's who is seeking to purchase a portfolio of insurance written as a single policy. Years 1-30 are one-year anniversary periods during the 30-year policy term. The time-varying, layered insurance policy of FIG. 4 provides a distinct coverage during each of the series of one-year anniversary periods within the 30-year policy term of the insurance policy. The time-varying coverage provided by the layered insurance policy is shown in bar-chart format, with a given coverage including as many as five layers of insurance during each of the one-year anniversary periods.

In FIG. 4, Layered Insurance Policy 400 is shown as having Life Insurance Layer 402, Supplemental Hospital Indemnity Insurance Layer 404, Health Insurance Layer 406, Mortgage Insurance Layer 408, and Disability Income Insurance Layer 410. In an example and referring to FIG. 3, Layered Insurance Policy 400 is built by a policy building module through a method similar to that described in Step 308, taking into account the client's needs as determined by a needs analysis module using a method similar to that described in Step 306.

In FIG. 4, the coverage associated with Life Insurance Layer 402 begins with a substantially level face value of insurance coverage (e.g., $1M, $500k, $300k, etc.) for years 1-20, and declines non-linearly to approximately zero at year 30. In an example, the insurance coverage associated with Life Insurance Layer 402 remains substantially level during the insured's peak needs years and then declines non-linearly as the insured ages. In another example, Life Insurance Layer 402 begins with a level face value of insurance coverage for years 1-20, and declines linearly to approximately zero at year 30. In yet another embodiment, Life Insurance Layer 402 begins with a level face value of insurance coverage for years 1-20, and declines in steps corresponding to the passing of a desired period of years until approximately zero at year 30. In this example, the face value of Life Insurance Layer 402 drops 50% at each five-year step. In other embodiments, other parameters are taken into account when calculating whether the coverage associated with Life Insurance Layer 402 changes at certain future points in time and may increase, decrease, or remain the same within these future periods of time.

In FIG. 4, the coverage associated with Supplemental Hospital Indemnity Insurance Layer 404 begins at a level coverage amount (e.g., $1k/day, $500 day, $250/day, etc.). In this example, the coverage associated with Supplemental Hospital Indemnity Insurance Layer 404 remains constant from years 1-20 and then expires. In another example the coverage associated with Supplemental Hospital Indemnity Insurance Layer 404 begins with a level coverage amount, and increases as the insured's income increases.

In FIG. 4, the coverage associated with Health Insurance Layer 406 begins with a level coverage amount, such as, for example including a high deductible health insurance policy and an associated HSA designed to keep premiums as close to level as possible of as long a time period as possible. In this example, the health insurance coverage associated will expire when the individual becomes eligible for Medicare at age 65.

In FIG. 4, the coverage associated with Mortgage Insurance Layer 408 begins with a level face value of insurance coverage (e.g., $500k, $250k, $150k, etc.) for 12 years, and declines linearly to approximately zero at year 30. In this example, the coverage associated with Mortgage Insurance Layer 408 declines as the insured ages and the mortgage debt is retired. In another example, the coverage associated with Mortgage Insurance Layer 408 begins with a substantially level face value of insurance coverage for 12 years, and declines non-linearly to approximately zero at year 30, for example, substantially matching the mortgage value as it declines to approximately zero at year 30. In yet another example, the coverage associated with Mortgage Insurance Layer 408 begins with a substantially level face value of insurance coverage for 12 years, and declines in steps to approximately zero at year 30.

In FIG. 4, the coverage associated with Disability Income Insurance Layer 410 begins with a substantially level coverage amount (e.g., 80% of salary/month, 0% of salary/month, 60% of salary/month, etc.) and declines non-linearly until the policy expires at year 20. In this example, the disability income insurance coverage will expire when the individual retires at age 65. In another example, Disability Income Layer 410 begins with a level coverage amount and expires at year 20. In yet another example, Disability Income Layer 410 begins with a level coverage amount, and increases when the insured's income increases. In this example, Disability Income Layer 410 expires at year 18 when the insured retires early at the age of 63.

Insurance layers 404, 406 and 410 provide examples of insurance coverage periods as a tool for building a single, time-varying, layered insurance policy. The concept of insurance coverage period may be applied to the term of an insurance layer, which for each of insurance layers 404, 406 and 410 is less than the coverage term of the policy.

The time-varying layered coverage 400 of FIG. 4 illustrates various methods for numerical analysis of determined needs data that may be employed by the policy building module in building time-varying layered coverage. Layered Insurance Policy 400 includes a series of one-year layered coverage amounts 412, each comprised of a plurality of coverage layers. For example, annual coverage amounts of the life insurance policy layer 402 may be calculated by applying discretization methods to the determined needs model 520 of FIG. 5. In another embodiment, the policy building module applies interpolation methods to calculate coverage values in insurance coverage periods including a sharp transition 414 in determined needs. In a further embodiment, the policy building module applies optimization methods to calculate multiple policy layers 402-410 over time, rebalancing these policy layers as appropriate.

In other embodiments, Layered Insurance Policy 400 can include additional, fewer, or differently arranged insurance layers. For example, Layered Insurance Policy 400 may additionally include one or more of a long term care insurance layer, a homeowner's insurance layer, an automotive insurance layer, a commercial liability insurance layer, and the like. In yet other embodiments, the coverage associated with one or more insurance layers may behave ways different to exponential decline, e.g. they may increase over time to a maximum and then decline, they may increase to a maximum and stay at that maximum, they may decline to a minimum and maintain the minimum coverage value, and the like.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A system comprising:
a personalization server configured with a computer-readable storage medium and including modules executable by a processor of the personalization server, the modules comprising:
a needs analysis module configured to receive inputted user data over a network from a user computing device that requests a bundle of computer records, wherein the user data comprises data related to user needs over time, and upon receiving the inputted user data, determine, for each layer of a plurality of layers of the requested bundle of computer records, time varying determined needs data over a determined needs timeline continuously over time over a predetermined time period, and store the determined needs data in a determined needs data database; wherein the needs analysis module is configured to convert the user data into the determined needs timeline included in the determined needs data;
a bundle building module configured to generate bundle data based upon the determined needs data in the determined needs data database to build a single time-varying bundle of computer records that is personalized to a user of the user computing device, wherein the bundle data aggregates a plurality of computer records based upon the determined needs data wherein each of the plurality of computer records is associated with one of the plurality of layers of the requested bundle of computer records; wherein the single time-varying layered bundle of computer records that is personalized to the user is represented in the determined needs timeline included in the determined needs data, and the bundle building module rebalances the plurality of computer records within a plurality of set of data periods represented in the determined needs timeline; and wherein the bundle data discretizes the plurality of computer records wherein the discretized computer records have a first bundle configuration for determined needs during a first time period within the predetermined time period and a second bundle configuration for determined needs during a second time period within the predetermined time period; and store the bundle data in a bundle data database; and
a bundle generating module configured to generate a single personalized, time-varying layered bundle of computer records using the bundle data in the bundle data database, wherein the single personalized, time varying layered bundle of computer records includes the aggregated, discretized plurality of computer records based on the determined needs data, wherein a term of the single personalized, time-varying bundle of computer records comprises the first time period and the second time period, and transmit a representation of the single personalized, time-varying bundle of computer records to the user computing device.

2. The system of claim 1, wherein the single personalized, time varying layered bundle of computer records provides a distinct set of data during each of a series of one-year anniversary periods within a bundle term of the single personalized, time varying layered bundle of computer records.

3. The system of claim 1, wherein the bundle generating module is configured to generate the single personalized, time-varying bundle of computer records based upon bundle generating criteria.

4. The system of claim 3, wherein the system issues to the user the single personalized, time varying layered bundle of computer records generated by the bundle generating module, via a user interface controlled by the personalized information server.

5. The system of claim 1, wherein the bundle building module is configured to present a proposal based upon the bundle data to the user for approval or disapproval, and wherein the bundle generating module generates the single personalized, time-varying bundle of computer records in the event of user approval of the proposal based upon the bundle data.

6. The system of claim 1, wherein the needs analysis module is further configured to present a form for inputting the user data selected from the group consisting of a needs questionnaire, a user profile questionnaire, and a timeline template.

7. The system of claim 1, wherein the bundle building module generates the bundle data including the plurality of computer records across multiple axes of set of data represented in the determined needs data, the multiple axes of set of data being selected from the group consisting of set of data periods of computer records, set of data amounts of computer records, and year-to-year coverage trends of computer records.

8. The system of claim 1, wherein the determined needs timeline comprises two or more of time periods associated with user life stages, key times associated with life events, and key times associated with user ages.

9. A computer-implemented method comprising:
transmitting, by a processor, a form for presentation on a graphical user interface for display on a user computing device to receive a request for a bundle of computer records, and an input of user data comprising data related to user needs over time, wherein the form includes a timeline template for identifying times or time periods and for providing user data associated with the identified times or time periods;
upon receiving, by the processor, a transmission of a bundle of computer records request message comprising the request for a bundle of computer records and the user data inputted via the form presented on the graphical user interface of the user computing device, executing, by the processor, a needs analysis model configured to configured to determine, for each layer of a plurality of layers of the requested bundle of computer records, time varying determined needs data over a determined needs timeline, by inputting the received user data into the needs analysis model to determine the determined needs data continuously over time over a predetermined time period; wherein the needs analysis model is configured to convert the user data into the determined needs timeline included in the determined needs data;
generating, by the processor, a single time-varying layered bundle of computer records that is personalized to the user and based upon the determined needs data, wherein the single time-varying layered bundle of computer records comprises a plurality of computer records, wherein each of the plurality of computer records is associated with the determined needs data for a respective layer of the layered bundle of computer records over at least a portion of the predetermined time period, wherein the single time-varying layered bundle of computer records that is personalized to the user is represented in the determined needs timeline included in the determined needs data, and the bundle building module rebalances the plurality of computer records within a plurality of set of data periods represented in the determined needs timeline; and wherein the generating comprises discretizing the plurality of computer records wherein the discretized computer records have a first bundle configuration for determined needs during a first time period within the predetermined time period and a second bundle configuration for determined needs during a second time period within the predetermined time period; and
transmitting, by the processor, a representation personalized to the user computing device of the single time-varying layered bundle of computer records including the first bundle configuration during the first time period within the predetermined time period and the second bundle configuration during the second time period within the predetermined time period for display on the graphical user interface.

10. The method of claim 9, further comprising the steps of
creating, by the processor, the single time-varying layered bundle of computer records personalized to the user including the plurality of computer records, each of the plurality of computer records represented in the determined needs data, based upon creating criteria; and
issuing to the user, by a user interface controlled by the processor, the single personalized time-varying layered bundle of computer records including the plurality of computer records represented in the determined needs data.

11. The method of claim 10, further comprising the step of presenting, by the user interface, a proposal based upon the bundle data to the user for approval or disapproval, wherein the creating and issuing steps are effected in the event of user approval of the proposal based upon the bundle data.

12. The method of claim 9, wherein the step of generating bundle data based upon the determined needs data, builds a single time-varying layered bundle of computer records that is personalized to the user that provides a distinct set of data during each of a series of one-year anniversary periods within a bundle term of the single time-varying layered bundle of computer records.

13. The method of claim 9, wherein the form for inputting user data further includes one or both of a needs questionnaire and a user profile questionnaire.

14. The method of claim 9, wherein the generating step comprises generating the bundle data across multiple axes of set of data selected from the group consisting of set of data periods of computer records, set of data amounts of computer records, and year-to-year set of data trends of computer records.

15. The method of claim 9, wherein the determined needs timeline comprises two or more of time periods associated with user life stages, key times associated with life events, and key times associated with user ages.

* * * * *